July 22, 1941.  H. E. LINDEMANN  2,250,135
CONTROL MECHANISM
Filed Jan. 22, 1938   2 Sheets-Sheet 1
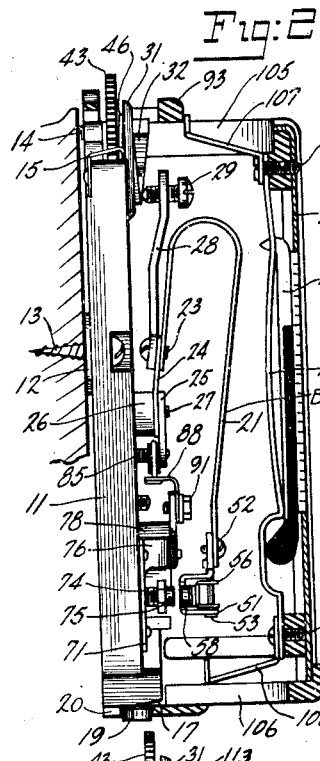
Fig:2
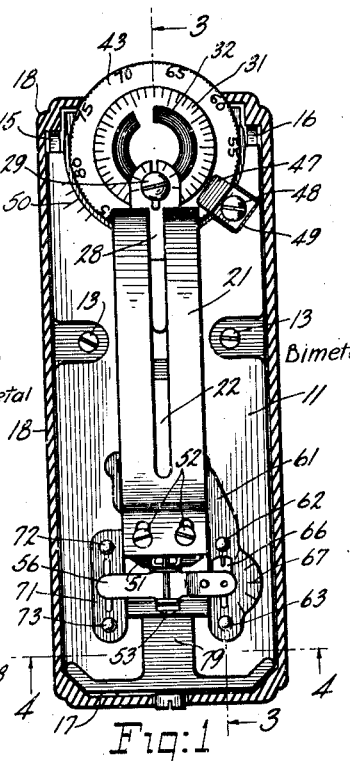
Fig:1
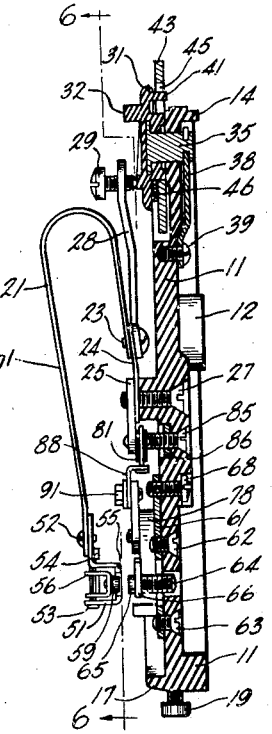
Fig:3
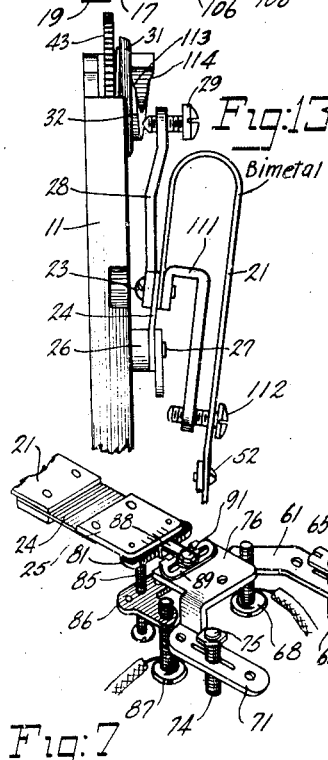
Fig:13
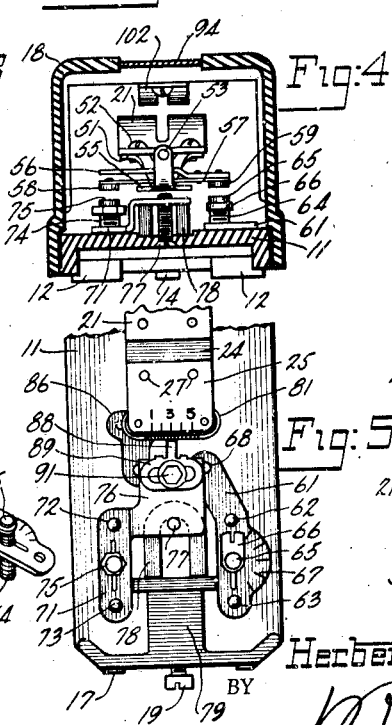
Fig:4
Fig:5
Fig:7
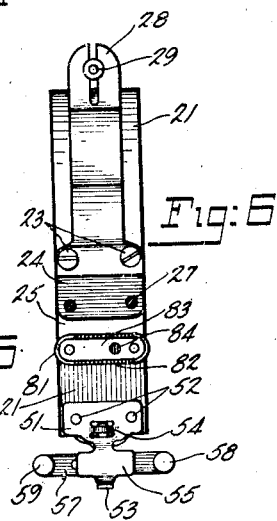
Fig:6
INVENTOR.
Herbert E. Lindemann
BY
ATTORNEY.

July 22, 1941.  H. E. LINDEMANN  2,250,135
CONTROL MECHANISM
Filed Jan. 22, 1938  2 Sheets-Sheet 2
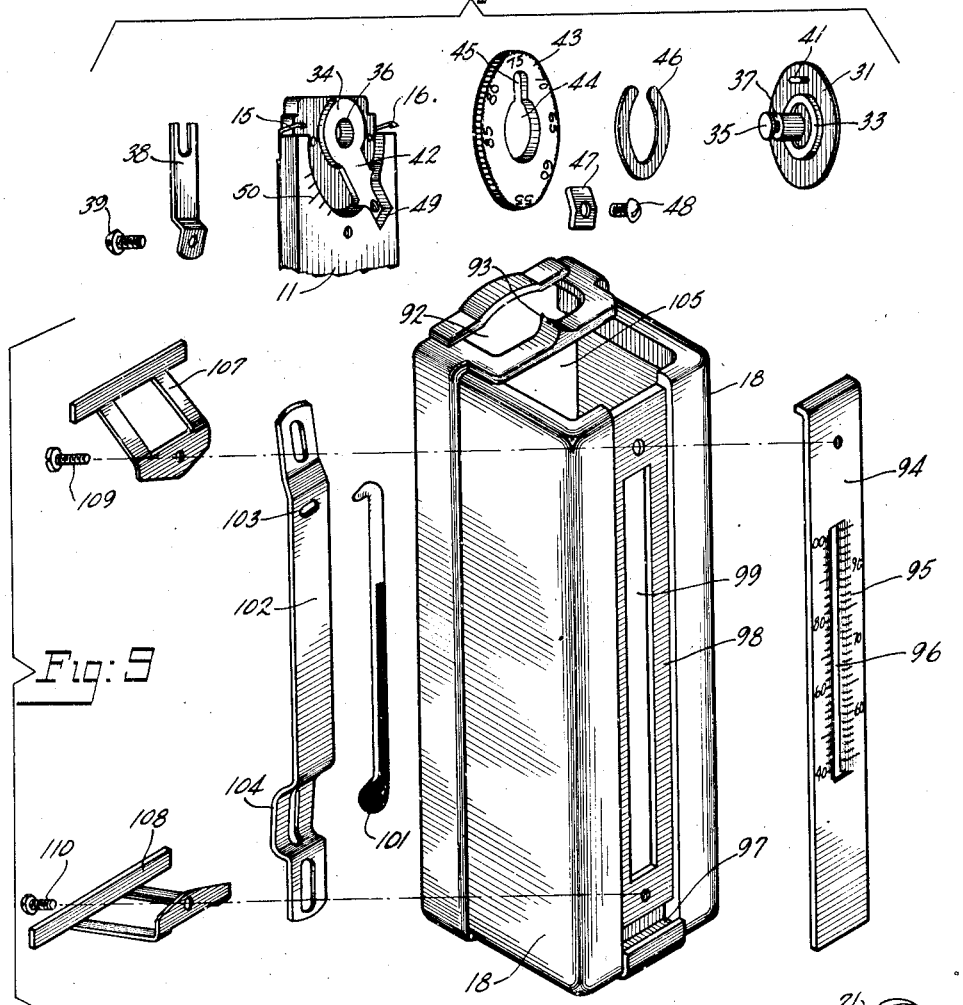
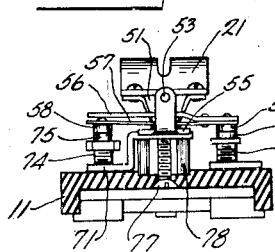
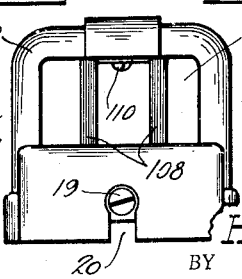
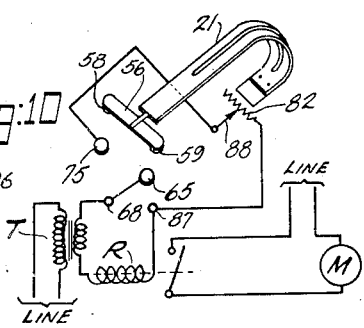
INVENTOR.
Herbert E. Lindemann
BY
ATTORNEY.

Patented July 22, 1941

2,250,135

UNITED STATES PATENT OFFICE 2,250,135

CONTROL MECHANISM

Herbert E. Lindemann, Milwaukee, Wis., assignor to Perfex Corporation, Milwaukee, Wis., a corporation of Wisconsin Application January 22, 1938, Serial No. 186,370

31 Claims. (Cl. 200—139)

This invention relates in general to control mechanisms but more particularly to physical condition responsive devices such as are employed in air conditioning systems and the principal object of the invention is to provide an improved control device which is accurate and reliable in operation and one that is extremely sensitive to physical condition variations.

A further object is to provide improved means for regulating or adjusting a control mechanism so that it may be set to operate at different predetermined physical conditions.

A further object is to provide an adjusting means for a control mechanism having a bi-metallic condition responsive element in which all abnormal strains or stresses are eliminated from the element itself.

Another object is to provide a cover for a control mechanism in which the cover is securely and resiliently locked in place on the switch base in a manner to protect the mechanism without binding or straining the cover.

An additional object is to devise a control mechanism having improved electrical switching means for the operating element of the device whereby positive and reliable snap action is effected in the circuit closing and opening movements of the switch.

An additional object is to provide a control mechanism with improved differential adjusting means for the switching mechanism.

A further object of the invention is to provide a control device with improved auxiliary heating means for accelerating the operation of the device under certain conditions.

An additional object is concerned with the provision of an improved adjustable thermometer support for a control devire.

An additional object is to provide means whereby the switching mechanism of a control device may be locked in either opened or closed circuit position if desired.

Another object is to provide an improved temperature control system in which a relatively constant temperature level is maintained in a room.

Other objects and advantages not specifically enumerated reside in certain novel features of construction, arrangement and combination of the parts which will be hereinafter more fully described and particularly pointed out in the appended claims in connection with a preferred embodiment, reference being had to the accompanying drawings forming a part of the specification and in which—

Fig. 1 shows a plan view of the control mechanism with the cover in section;

Fig. 2 is a side view with the cover in section;

Fig. 3 is a cross-sectional side view along the line 3—3 of Fig. 1;

Fig. 4 is an end view along the line 4—4 of Fig. 1 showing the cover in section;

Fig. 5 is a fragmentary portion of the lower end of the control device;

Fig. 6 is a view of the bi-metallic element and its associated switching, adjusting and heater elements taken along line 6—6 of Fig. 3;

Fig. 7 is a perspective view of the switching and other elements of the control device showing the electrical circuit path through the device;

Fig. 8 is a perspective view, showing in extended relationship the elements constituting the manual adjusting means;

Fig. 9 is a perspective view showing in extended relationship the various parts associated with the cover of the device including the thermometer;

Fig. 10 is a schematic circuit diagram incorporating the control device;

Fig. 11 is an end view like Fig. 4 but showing the contacts in closed position;

Fig. 12 is an end view of the device; while

Fig. 13 is a modification whereby the contacts may be locked in either open or closed position.

It has been chosen by way of example to illustrate the invention in connection with a thermostatically controlled switch mechanism such as a room thermostat which may be located in a room or space to be heated and arranged to automatically control a burner motor or heating plant to maintain the room at a comfortable temperature. In another of its forms the control mechanism may be arranged to effect its control according to humidity, pressure or other physical condition responsive forces. As illustrated in the drawings, referring particularly to Figs. 1 and 2, the control mechanism and its elements are preferably supported upon a molded insulation base member 11, of substantially an oblong shape. This base 11 is provided at its rear side with a pair of spaced projecting portions 12, having openings therein for the accommodation of a pair of mounting screws 13, whereby the control instrument may be supported upon a flat wall surface or mounting plate. At the upper end a further small projection 14 is adapted to engage the supporting wall surface in case the user accidentally applies pressure to the device while manually adjusting the same.

The projections 12 also enable the instrument to be mounted in position slightly away from the mounting surface in order that any uneven portions of this surface will not cause abnormal stresses or strains upon the base member 11. The delicate adjustment of the instrument is thereby not affected or strained.

At its upper end the base member 11 is provided with a pair of oppositely spaced shoulder portions upon which one end of a pair of spring clips 15 and 16 are secured as by rivets. The other ends of the clips 15 and 16 extend upwardly and outwardly from the base 11. At its lower end base 11 has formed thereon a pair of sloping cover engaging surfaces 17 (see Fig. 5). In order to protect the elements mounted upon the base 11 a cover 18 is provided, the general contour of which is illustrated in Fig. 9 and which is preferably cast or moulded of suitable material. At its upper end the inside edge of the cover 18 is provided with shoulder portions as seen in Fig. 1 which engage and press against the spring clips 15 and 16 upon the association of the cover with the base. As the cover is slipped over the base the sloping surfaces 17 on the bottom of the base also engage the lower inside edge of the cover to forcibly and resiliently engage the spring clips 15 and 16 with the cover shoulders as the cover is moved into place. With this arrangement it is obvious that all stresses or strains upon the cover such as that caused by clamping screws are relieved while at the same time it is tightly and securely held in position. At its lower end the base 11 is provided with a threaded screw 19, the shank of which engages a slot 20 in the cover as it is slid into position on the base, after which the head may be screwed inward to engage a somewhat larger opening in the cover and thereby securely lock the cover and base together as seen in Fig. 12. With this locking arrangement no stresses are placed upon the cover or the base which might affect the critical adjustment of the apparatus.

A physical condition responsive element shown here in the form of a thermostatic element 21 is provided as the operating or controlling medium for the control mechanism. It is constructed in the well known manner of two dissimilar pieces of metal associated with each other which have the inherent characteristic of effecting a change in shape responsive to changes in temperature. This bi-metallic element 21 is constructed with the expanding metal on the inside and is bent into substantially a U-shaped form as shown, with one of the legs of the U somewhat longer than the other. A slot 22 is cut for a substantial distance through the center and length of the bi-metallic element 21 in order to relieve internal strains and to provide better circulation of the air about the element so as to render it more sensitive to temperature changes. A further advantage in providing this slot 22 is that the bi-metallic element is rendered more flexible and therefore more effective in its response. The shorter leg of the element is attached by means of a pair of screws 23 to a flat steel spring hinge 24, the other end of which is clamped between a metal plate 25 and a projecting portion 26 of the base by a pair of screws 27 extending from the rear side of base. By providing this spring hinge type of construction the bi-metallic element 21 operates with greater accuracy and sensitivity due to the fact that no lost motion or loose connections for supporting the element are employed.

A stiff adjusting or connecting arm 28 is clamped together with the element 21 to the end of the spring hinge 24 by the screws 23. This arm 28 extends upwardly along the base and is provided at its upper end with a calibrating screw 29 which threads into the upper end of arm 28 through a narrow slot (see Fig. 6), so that the calibrating screw 29 when once set to the desired position will remain locked in that position due to the tension exerted on the screw by the threads on the inside of the slot. The upper surface of the connecting arm 28 around the screw 29 is provided with graduations marked thereon as seen in Fig. 1 for determining the setting of the calibrating screw 29. The purpose of this adjustment is to calibrate the thermostatic element 21 for temperature conditions by varying its position with respect to the base so that it can be made to operate exactly in accordance with the reading of a standard condition indicating device such as a thermometer for example. It is to be noted that the shorter supporting end of the bi-metallic element 21 is supported upon the front side of the base 11 while the longer free end is positioned so as to effect an operating movement in a direction perpendicular to the base. On a rise in temperature the free end of element 21 moves away from the base but the element may be constructed with the expanding metal on the outside so that upon a temperature rise the free end will move toward the base instead of away from it.

It is desirable that the bi-metallic elements 21 be so arranged that it will effect its control at any predetermined temperature and for this purpose a means comprising a molded insulating cam disc 31 having graduations marked in terms of degrees around its periphery is provided. Cam disc 31 is arranged to be rotatably mounted in a recess at the upper end of the base. This disc 31 has formed integral therewith a helical cam 32 upon the curved surface of which the calibrating screw 29 bears and is adapted to ride due to the tension exerted by the spring hinge 24 upon the connecting arm 28 so as to vary the position of the arm with respect to the cam. As best seen in Fig. 8, the disc 31 is provided on its rear side with a projecting circular shoulder or bearing portion 33 which is arranged for rotative sliding movement upon a cooperative projecting portion 34 formed in the base 11. A metallic hub member 35 molded in the disc 31 passes through an opening 36 in the base to the rear side thereof and is provided near its end with a groove 37 adapted to be engaged by the forked end of a leaf spring member 38. The spring member 38 has its lower end securely fastened to the rear of base 11 by a screw 39 which threads into the base as seen best in Fig. 3. The spring member 38 constantly exerts its pressure on the hub 35 to hold the disc 31 yieldingly against the bearing surface 34 of the base while permitting it to be rotated. The rear side of the disc 31 is also provided with a projecting stop member 41 which limits the rotation of the disc 31 in either of its directions by engaging the sides of a raised portion 42 on the base 11.

A manually rotatable dial or number disc 43 having its edges knurled to facilitate manipulation of the same is provided with an opening 44 adapted to encircle and bear upon the outer edge of the shoulder 33 of disc 31. The dial also has a series of numbers stamped around its face for indicating temperature readings. A slot 45 which accommodates the stop 41 is cut in the dial 43 so that any rotative movement of dial 43 likewise causes the disc 31 to move along with it. A dish shaped spring washer 46 is positioned between disc 31 and dial 43 and tends to separate the cam disc 31 and dial 43 which enables the dial 43 to be manually rotated and still prevent it from being loose or from rattling. A section of this washer 46 is cut away to accommodate stop 41.

It is occasionally desirable that the cam 31 be locked in a particular set position as when the device is located in a public place so as to prevent unauthorized manipulation of the same, and in order to provide for this a locking member 47 is arranged to be clamped directly on top of the dial 43 by a screw 48 threaded in the base. To prevent movement of the locking member 47 with the dial it is positioned with a recess 49 of the base and clamped therein. This arrangement clamps and locks the dial 43 directly upon the flat raised surface 42 of the base without binding or bending the same in any manner or without altering the adjustment of the cam 32. When the effect of the locking member 47 is not required screw 48 is loosened.

The means for actually controlling the physical condition to which the control mechanism responds is here disclosed in the form of an electrical switching mechanism which may control the circuit of some air conditioning device as will be hereinafter pointed out. The longer leg of the bi-metallic element 21 is provided at its free end with a switch supporting bracket member 51 which is secured to the element by a pair of screws 52 engaging elongated slots in the element as best seen in Figs. 1 and 6. This bracket member 51 has an extended U-shaped portion with the bottom of the U somewhat enlarged and serving as a magnetic armature 55. The free turned up end of bracket 51 is narrow with a bearing pin 53 extending therethrough and arranged to engage a punched up portion 54 (Fig. 6) of bracket 51 in such manner that the end of the pin is securely clamped by the screws 52 between the portion 54 and the inner surface of the bi-metallic element 21. As best seen in Figs. 4 and 11, a rigid stop bar 56 having turned up ear portions through which pin 53 extends is nested in the bracket 51 and pivoted on pin 53 to permit rotative movement to the bar 56. The rigid bar 56 carries a flexible arm 57 suitably riveted to one end of the bar in a manner so that a slight separation is normally provided between the free ends of these two elements. The outer edges of armature 55 serve as stops to limit the rotative movement of the bar 56 about pin 53 by engaging the adjacent sides of flexible arm 57. The flexible arm 57 carries a movable contact point 58 at its free end. A second movable contact point 59 is carried at the ends of bar 56 and arm 57 which are riveted together. To insure long life and maximum flexibility the flexible arm 57 is made of phosphor bronze material, while the contact points 58 and 59 are preferably made of silver. It will be obvious that movement of the end of the bi-metallic element 21 causes a perpendicular movement of the movable switch contact mechanism with respect to the base.

The fixed portion of the control or switching mechanism includes a metal contact plate 61 fastened to the front of base 11 by screws 62 and 63 threaded into the plate from the rear of the base. A contact stud 64 threads into the contact plate 61 which is split around the stud threads in order to provide a tight fit for the stud and prevent its displacement after having once been properly set. At its outer end the stud 64 is provided with a fixed contact point 65 and also with a lug portion 66 having a screw driver slot therein to permit the turning of the stud 64 to any one of the graduations 67 marked upon the contact plate 61 for the purpose of adjusting the differential of the switch. A terminal screw 68 is threaded into one end of the contact plate 61 from the rear of the base 11.

A second contact plate 71 is also positioned upon the front of the base 11 and secured thereto by means of screws 72 and 73 threaded through the plate from the rear of the base. This plate 71 is likewise provided with a contact stud 74 threaded into split threads in plate 71 which resiliently and tightly hold the stud in its proper set position. At its outer end the stud 74 is provided with a fixed contact point 75 as well as a nut formed on the stud to permit adjustment of the distance of the contact surface from the base. The plate 71 is provided with an extended portion 76 offset from the base into which a clamping screw 77 threads from the rear of the base. This portion 76 provides a means whereby a permanent horse-shoe magnet 78 is clamped in position on the base. A reinforcing and spacing portion 79 formed integral with the front of the base 11 serves as a spacer for the plates 61 and 71 as well as the magnet 78. The openings in element 21 through which screws 52 extend are somewhat enlarged whereby the movable contacts 58 and 59 may be conveniently altered in order to align them with the fixed contacts and so they may properly cooperate therewith. This is accomplished by changing the position of the bracket 51 and shifting the screws 52 in the slots of the bi-metallic element 21.

In certain instances where the condition responsive device takes the form of a thermostatic switch it is customary to employ some means in connection with the thermostatic element in order to accelerate or modify the action of the same during a certain portion of its operating cycle. This action is utilized to compensate for the natural lag between the operation of the burner apparatus and the change in temperature at the thermostat. In the drawings, Figs. 5 and 6, an example of such an accelerating means is illustrated in the form of a rheostat or adjustable heater as indicated generally by reference character 81. In the form shown the unit 81 consists of a flat core of insulating material having wound thereon a plurality of turns of resistance wire forming a resistor element 82. Flat protective insulating members 83 are placed on each side of the element 82 and are suitably riveted together as shown and to the lower end of the metal plate 25. At one end of the heater 81 several turns of the resistor wire 82 are soldered together directly under an opening 84 in insulator 83. A contact screw 85, threaded from the rear of the base 11 through a metal contact plate 86, extends through opening 84 and makes electrical contact with the soldered end of the resistor element 82. A terminal screw 87 likewise is threaded into the contact plate 86 from the rear of the base. A contacting finger or wiping element 88 formed out of an adjustable member 89 bears resiliently against several of the turns of the resistor wire 82 in order to make electrical contact therewith. The member 89 is provided with an elongated slot into which an adjusting screw 91 extends and which threads into the top of plate 76. By loosening screw 91 the member 89 may be moved or adjusted laterally to any desired position so that the wiper arm 88 will make contact with the resistance wire 82 at any desired position in order to either increase or decrease the amount of resistance in the electrical circuit. Suitable indicia on top of the metal plate 25 are provided to indicate the setting of the wiper arm 88. The adjustability of the heater enables it to be arranged for operation under all operating conditions and for different installations.

As has been pointed out the control mechanism is provided with a protective cover 18 and as best seen in Fig. 9 its upper end is arranged with an opening 92 for the accommodation of the dial number wheel 43 so that it can project through and be visible and accessible for manipulation from the outside of the top of the cover. An indicator or pointer 93 formed in the cover cooperates with the graduations on cam disc 31 and figures on dial 43 for indicating the temperature value at which the instrument is set for operation. The front of cover 18 is provided with a metal scale plate 94 having suitable temperature graduations 95 marked thereon along both sides of an opening 96 in the plate. The bottom end of scale plate 94 is set into a slot 97 of the cover 18 and the remaining portion of the scale plate lies within a recess 98 in the cover directly on top of an elongated slot 99 also cut in the cover. A suitable thermometer 101 is placed in the opening 99 against the turned in portions of scale plate 94 surrounding the opening 96, so that a reading of the thermometer against the scale 95 is readily visible from the front of the cover.

In order to hold the thermometer 101 in its set position (see Fig. 2) a resilient metal strip 102 resiliently presses the thermometer against the rear of the scale plate 94, and an opening 103 in the strip 102 enables the upper end of the thermometer to be securely cemented in fixed position with respect to strip 102. The lower end of strip 102 is provided with a curved portion 104 to render the strip more flexible and provide an offset for accommodating the lower bulb end of the thermometer 101. Screw openings in the form of slots are provided on the top and bottom end of the strip 102 in order that the strip can be shifted endwise to calibrate the thermometer with the scale readings 95 on the scale plate 94.

The upper and lower ends of the cover 18 are provided with openings 105 and 106 in order to permit free circulation of the air around and through the inside of the instrument to affect the bi-metallic element. Since it is sometimes desirable that these openings be guarded in some manner to prevent electrical shock to a person or damage to the instrument, guard plates 107 and 108 are located within the openings 105 and 106. The upper guard plate 107 engages the front edge of pointer 93 as seen in Fig. 2 and the lower guard plate 108 sets in a recess in the cover. A clamping screw 109 as shown in Fig. 9 extends through screw holes in the guard plate 107, the strip 102, the upper end of cover 18 and into threaded engagement with the scale plate 94. At the bottom end a similar clamping screw 110 extends through screw holes in guard plate 108, strip 102, and threads into the lower end of cover 18. By providing this arrangement wherein a single pair of screws holds all of the aforesaid elements on the cover in their associated relationship their assembly is greatly simplified and facilitated. It is also possible to provide scale plates 94 of different types where various graduated scale readings are required for the same type of instrument since they are removably held to the cover by the single screw 109 and slot 97.

For the purposes of calibrating the control mechanism when initially assembled a series of graduations 50 are marked upon the front of the base adjacent the periphery of the dial 43. In calibrating the instrument it is first placed in a room where the known temperature is 70 degrees, and the dial 43 rotated until the numerical indication "85" is positioned opposite the center of one of the graduations 50 at which point the indicating numeral "70" will be directly on top of the dial 43 and opposite pointer 93 if the cover were on. The calibration adjusting screw 29 is then turned until the bi-metallic element 21 just closes the contacts. The instrument will now close the contacts at any temperature to which the dial 43 is rotated with respect to pointer 93.

The differential of an instrument of this type is the change in temperature of the bimetal element necessary to cause said element to open and close the contacts. This differential may be calibrated by adjusting studs 64 and 74 to give a small clearance between armature 55 and magnet 78. By leaving the stud 64 with the screw driver slot on lug 66 pointed at one end of the scale 67 for minimum differential, the other stud 74 can be adjusted to vary the air gap until the desired minimum differential of one or more degrees is obtained. By turning lug 66 across scale 67 the air gap between armature 55 and magnet 78 is decreased, thereby increasing the magnetic pull and widening the differential.

The contacts are opened and closed with snap action which can best be explained by assuming that the dial 43 is set at some temperature value slightly below the actual ambient temperature around the thermostat and that the contacts are open. As the ambient temperature falls the free end of element 21 moves the armature 55 together with the movable contacts towards the base (see Fig. 4). As the armature 55 is gradually brought within the influence of magnet 78 the intensity of the magnetic field emanating from the magnet correspondingly increases and the inherent resiliency of the bi-metallic element 21 is overcome until the cooperating contact sets 58 and 75, and 59 and 65 respectively, engage with a distinctive snap action. Due to the resiliency of element 21 and flexible arm 57, a slight wiping action takes place between the contacts as they engage, so that they are always bright and clean. After contact 58 engages the fixed contact 75, the end of the rigid bar 56 engages the rear side of contact 58 as seen in Fig. 11 so that the contacts are thereby tightly held in close association with one another by the pull of the magnet. This arrangement renders the closed contacts immune to vibration or shock and they cannot open the circuit accidently. The engagement of the rigid bar 56 with contact 58 acts as a stop and limits the air gap between the armature 55 and magnet 78 and prevents their actual engagement when the contacts are closed. By pivoting the rigid bar 56 on pin 53 to the element 21, a self-adjusting or leveling action of the movable contacts with respect to the rigid contacts is brought about when they close, as well as enabling a closer differential adjustment to be made. By attaching the flexible arm 57 to one end of the rigid bar 56 a greater flexibility of the arm is likewise acquired.

The closing of the contacts effects a control in the conditioning system to which this device is applicable whereby a rise in temperature of the space surrounding the device is effected. The bi-metallic element 21 accordingly responds to this condition to effect an opening of the contacts. As the free end of element 21 tends to move away from the base 11 energy is stored in resilient element 21 until a balance of force is reached between element 21 and magnet 78 (see Fig. 11). Shortly after this balance point is reached the armature is rapidly moved away by the element 21 and the contacts are opened with a snap action. Because, however, of the flexibility of the flexible arm 57 the movable contacts remain in engagement with the fixed contacts for a short interval after the balance of force between the magnet and the bi-metallic element has been passed, and after the free end of the rigid arm 56 moves away from the rear end of the movable contact 58. When this occurs the contacts open quickly and positively and with a distinctive snap action. The foregoing operation of the bi-metallic element in its function of opening and closing the contacts in a snap acting manner precludes the possibility of the formation of destructive arcs between the contacts, prevents chattering between them as the bi-metallic element responds to temperature changes, and because of the slight wiping action upon the closing and opening of the contacts, maintains them in good electrical conductive condition. Sticking or slight welding of either set of contacts is overcome by the pivoted movement of the rigid bar which will allow one set of contacts to open and at the same time pry the sticking contacts loose immediately.

The rigid bar 59 and the flexible arm 57 serve as a connecting bridge between the fixed contacts 65 and 75 and the opening of either set of contacts therefore interrupts the current flow through this bridge. The advantages of this type of arrangement are that the use of flexible lead wires or pig tail connections are eliminated. By hinging the movable contacts to the bi-metal the pressure is equal on both sets of contacts. Since the device has positive snap action on both opening and closing of the contacts it may be mounted in any off normal position without affecting its accurate operation.

Referring now particularly to Fig. 7 the electrical circuit path through the various elements of the control mechanism are clearly depicted, while the schematic circuit arrangement of Fig. 10 shows a typical control circuit incorporating the device. The line voltage current is usually fed through a step down transformer T, with one end of the secondary winding connected by a wire extending to terminal screw 68. The other end of the transformer winding is connected to the winding of a relay R the other end of which is connected to terminal screw 87. The relay R controls the circuit to the burner motor M. Assume now that the bi-metal 21 operates in response to a temperature drop. The contacts are consequently closed and a circuit path is established extending from one side of the transformer T through the following elements; terminal screw 68, contact plate 61, contact stud 64, fixed contact point 65, movable contact point 59, flexible arm 57 and rigid bar 56, movable contact point 58, fixed contact point 75, contact plate 71 and 76, member 89 and its wiper arm 88, through the several turns of the risistance wire 82, contact screw 85, contact plate 86, terminal screw 87, through the winding of electromagnet R to the other side of the transformer winding.

As a result of the establishment of the foregoing circuit path relay R is energized and closes the circuit of the burner motor M which thereupon operates to increase the temperature of the room within which the thermostat is located. Before the ambient temperature rise is sufficient to open the contacts however, the heater element 81 is heated up by the current passing through the resistor 82, and slowly transmits the heat generated thereby through the plate 25 and spring hinge 24 to one end of the bi-metallic element 21. The operation of the bi-metal element is consequently hastened or accelerated prior to the time when it would have been effected by the rise of temperature in the space. This arrangement accordingly prevents the possibility of an excessive rise in room temperature or "over shooting" after the thermostat has disconnected the heat generating means which is caused by the time lag between the production of the heat in the furnace and the delivery of the same to the space being heated. As soon as the element 21 has been heated a predetermined amount by the combined effects of the increased ambient temperature and heater 81, it opens its contacts to interrupt the circuit of relay R which in turn opens the circuit of motor M and terminates the production of heat.

The heater is so arranged upon the base that the heat generated thereby is somewhat slowly conducted through the plate 25 and the thin spring hinge 24, to the fixed end of the bi-metallic element. The short steel hinge acts to retard the transmission of the heat and since the heater is arranged close to the bi-metal element the transmission of the heat is always at a uniform, constant and unvarying rate.

It may be desirable that the electrical heater such as 81 take a different form and provide a similar heating function. By constructing the flexible arm 57 of a resistance material such as nicrome metal and the contact points of a resistance material such as platinum iridium metal, this may be accomplished. These metals have the quality of somewhat resisting the passage of an electric current through them and thereby generate a certain amount of heat which is utilized to exert its effect of accelerating the operation of the bi-metal element. In this case the heat is conducted to the bi-metal through pin 53 which furnishes a short path of relatively high heat resistance. Because of the poor contact between rigid bar 56 and the back of contact 58 most of the current flows through flexible arm 57 and very little through rigid bar 56.

Since the heat generated in these auxiliary heaters is very small and because of their arrangement with respect to the bi-metal, the amount of radiant heat affecting the bi-metal is practically negligible. By the use of the auxiliary heaters the mechanical differential of the thermostat is decreased because the action of the thermostat is accelerated, and therefore the thermostat anticipates a rise in room temperature. This results in shorter but more frequent burner operations and thereby a more uniform or level temperature control is effected. Because of the extreme sensitivity and the close differential that it is possible to obtain with this control device, very little additional heat is required to obtain satisfactory results and the so called "drooping" effects are eliminated. This "drooping" characteristic is usually caused by the frequent burner operation necessary in severe cold weather which tends to slightly depress the operating characteristics of the thermostat. In other words, the frequent thermostat operation tends to accumulate the heat in the heater and a certain amount of residual heat is retained each time from the previous thermostat operation. Therefore although the thermostat is set to operate at 70 degrees for example, it actually may be operating at a room temperature of only 68 degrees due to the thermostat being heated above room temperature. The artificial heat produced by the heater is not required to increase the sensitivity of the thermostat, but is only utilized to shorten the interval during which it closes its contacts to maintain the burner in operation.

Since the thermostat effects a more frequent operation of the burner and thereby maintains the room at a more uniform and constant temperature level, the overrun and underrun of room temperatures is consequently eliminated. For the same reasons air stratification commonly known as "cold 70°" is greatly minimized.

The owner of premises equipped with thermosatically controlled burner equipment may occasionally leave the house unattended for comparatively long periods of time. In these circumstances he may desire to completely shut down his heating plant and prevent its operation during his absence. In other circumstances he may wish to continue the operation of the heating plant for indefinite periods of time. To provide for these contingencies the simple arrangement disclosed in Fig. 13 may be applied to the control instrument. It consists of a relatively stiff metal locking bracket 111 bent into a U-shape with the shorter leg rigidly clamped by the screws 23 so that it can be moved in unison with the adjusting arm 28 about the spring hinge 24. An adjusting screw 112 extends through the slot 22 of the bi-metal element 21 and threads into the longer leg of the locking bracket 111. To prevent the closure of the switching contacts and therefore the operation of the burner the dial 43 is rotated counter-clock-wise its maximum distance whereby an abrupt cam surface 113 on cam 32 causes the adjusting arm 28 to move towards the base 11. The bracket 111 as a result tilts away from the base about hinge 24. Should the bi-metal 21 now more toward the base or to contact closing position it will shortly strike the end of bracket 111 and its movement arrested before the contacts can be closed.

In case it is desired to maintain the contacts indefinitely in closed position and the burner operating continuously, the dial 43 is rotated clock-wise to its limit of rotation whereupon an abrupt rise 114 on cam 31 will engage screw 29 to move adjusting arm 28 away from the base. The bracket 111 as a result is tilted towards the base so that the head of screw 112 engages the top side of the bi-metallic element 21. The contacts are thereby locked in closed circuit position irrespective of any movement that the bi-metal may make in response to temperature variations. The distance between bracket 111 and the head of screw 112 is sufficient to permit the bi-metal 21 to make and break the circuit if the calibrating screw 29 engages cam 32 at any point intermediate the abrupt cam surfaces 113 and 114.

While only a preferred embodiment of the invention has been illustrated and described it will be apparent that numerous modifications and variations of the same may be made by those well versed in the art without departing from the spirit of the invention and it is therefore desired that the invention be not limited to the exact disclosure but only to the extent of the scope of the appended claims.

What is claimed is:

1. A control instrument of the class described comprising an elongated base, a support arranged on one face of the base near the mid-portion thereof, a flat spring hinge mounted on said support, said spring hinge being disposed generally parallel to said base and spaced therefrom by said support, a flat U-shaped bimetal element having a long leg and a short leg, the short leg being secured at its end to the free end of said spring hinge and the long leg extending from the bight of the U-shaped element over said spring hinge and having its free end at one end of the base, control means having a portion secured to the base, said control means being actuated by relative movement between said free end of the bimetal element and the base, an adjusting arm secured to the short leg of the bimetal element and extending to the other end of the base, control point adjusting means located at said other end of the base, said adjusting means comprising a rotatable member engaging the base and adapted to cause movement of the adjusting arm relative to the base upon rotation of said rotatable member, an indicator and indicia cooperating to indicate the angular position of said rotatable member and consequently the control point adjustment of the instrument, and means including a calibrating screw engaging said adjusting arm for positioning said bimetal element relative to said control point adjusting means for calibrating the instrument.

2. A control instrument of the class described comprising an elongated base, a support arranged on one face of the base near the mid-portion thereof, a flat spring hinge mounted on said support, said spring hinge being disposed generally parallel to said base and spaced therefrom by said support, a flat U-shaped bimetal element having a long leg and a short leg, the short leg being secured at its end to the free end of said spring hinge and the long leg extending from the bight of the U-shaped element over said spring hinge and having its free end at one end of the base, an armature bracket attached to said free end of said bimetal element, a movable contact actuated by said bimetal element, a fixed contact secured to the base and adapted for engagement with said movable contact, a permanent magnet secured to the base and adapted to cause engagement and disengagement of said contacts with snap action, said contacts acting as stops between said armature and bracket, one of said contacts being carried by an adjustable stud, adjustment of the stud varying the distance between the armature and bracket when the contacts are closed and thus varying the operating differential of the instrument, an adjusting arm secured to the short leg of the bimetal element and extending to the end of the base remote from said contacts, control point adjusting means located at said remote end of the base, said control point adjusting means comprising a rotatable member engaging the base and adapted to cause movement of the adjusting arm relative to the base upon rotation of said rotatable member, an indicator and indicia cooperating to indicate the angular position of said rotatable member and consequently the control point adjustment of the instrument, and means including a calibrating screw engaging said adjusting arm for positioning said bimetal element relative to said control point adjusting means for calibrating the instrument.

3. A control mechanism of the class described comprising a base member, a physical condition responsive element, means for mounting the element on the base member, a fixed contact secured to said base member, a movable contact actuated by the element and engaging the fixed contact upon changes in the physical condition, a cam member rotatably mounted on the base member and having a helical cam surface, a connecting arm connected to the element mounting means and associated with the helical cam surface, the axis of rotation of said rotatable member being perpendicular to the base member, means including resilient means for holding said connecting arm against said helical cam surface whereby the element is adjusted in a plane perpendicular to the base member upon rotation of the rotatable member, a calibrating screw on the end of the connecting arm in contact with said helical cam surface for varying the position of the connecting arm with respect to the helical cam surface, and magnetic means associated with said contacts for providing snap action to their operation.

4. A control mechanism of the class described comprising an elongated base, a fixed control element mounted on the base near one end thereof, a flat spring hinge secured at one end to the base, a physical condition responsive element associated with the other end of the spring hinge, a movable control element in operative relation to the fixed control element and operated by the condition responsive element, an armature supported with the movable control element, a magnet supported on the base in operative relation to the armature for providing snap action to the operation of the control element, a helical cam rotatably mounted on the other end of the base with the axis of the cam perpendicular to the base, a connecting arm having one end associated with said other end of the spring hinge, and a calibrating screw associated with the arm for changing the relationship between the condition responsive element and the cam.

5. A control mechanism of the class described comprising an elongated base, a flat U-shaped thermostatic element responsive to temperature changes arranged on the base with both legs of the U extending parallel and in the same direction on the base, hinge means connecting one end of one of the legs intermediate the base ends, the end of the other leg extending beyond said hinge means towards one end of the base, a control element carried by the end of said other leg, another control element mounted on the base in operative relation to said first control element, an adjusting cam having a helical surface arranged for rotative movement mounted on the end of the base remote from the control elements, a connecting arm extending from said hinged leg to the helical cam surface whereby the position of said thermostatic element can be varied to render it responsive to various predetermined temperature values, and a calibrating screw threaded into the end of the connecting arm and engaging the helical cam for calibrating the thermostatic element.

6. A control mechanism of the class described comprising an elongated base, a fixed contact mounted near one end of the base, a flat spring hinge secured at one end to the base near the center thereof, a flat U-shaped thermostatic element having the end of one leg of the element secured to the other end of the spring hinge and having the other leg of the element extending beyond the spring hinge, a movable contact carried on the end of the last mentioned leg of the element and in operative relation to the fixed contact, a helical cam rotatably mounted on the other end of the base with the axis of the cam perpendicular to the base, a connecting arm having one end secured to said other end of the spring hinge, and a calibrating screw carried on the other end of the arm and held in engagement with the cam by means of the tension of the spring hinge.

7. A control mechanism of the class described comprising an elongated base, a contact mounted near one end of the base, a flat spring hinge secured at one end to the base near the center thereof, a flat U-shaped thermostatic element having the end of one leg of the element secured to the other end of the spring hinge and having the other leg of the element extending beyond the spring hinge, a movable contact carried on the end of the last mentioned leg of the element and in operative relation to the fixed contact, an armature supported on the end of said other leg of the thermostatic element, a magnet supported on the base in operative relation to the armature for providing snap action to the operation of the contacts, a helical cam rotatably mounted on the other end of the base with the axis of the cam perpendicular to the base, a connecting arm having one end secured to said other end of the spring hinge, and a calibrating screw carried on the other end of the arm and held in engagement with the cam by means of the tension of the spring hinge.

8. A control device of the class described comprising a base, a thermal element, an electric heater on the base, a spring hinge for supporting and biasing the thermal element upon the base and for conducting the heat from the heater to the thermal element, and control means actuated by the thermal element.

9. A control device of the class described comprising a base, a support arranged on one face of the base, a spring hinge having one end fixed to said support, the other end of the spring hinge being free to move with respect to said support, means including a clamping plate engaging one face of the fixed end of said spring hinge for securing the spring hinge to the support, a thermostatic element having one end secured to the free end of the spring hinge and the other end free to move with respect to the base, a control means actuated by the free end of said thermostatic element, control point adjustment means operable to move said thermostatic element about its spring hinge, and an electric heater mounted in good heat conductive relationship with the clamping plate for applying false heat to the thermostatic element by conduction through the spring hinge.

10. A control device of the class described comprising a base, a thermostatic element, a spring hinge for operatively supporting and biasing the thermostatic element upon the base, an electric heater on the base for modifying the action of the thermostatic element, said spring hinge also thermally connecting the heater with the thermostatic element for conducting the heat from the heater to the thermostatic element, and cooperating control means on the thermostatic element and on the base actuated by the thermostatic element.

11. A control mechanism of the class described comprising a base member, an elongated temperature responsive element, a flat spring means hingedly supporting said temperature responsive element intermediate the ends of the base for movement perpendicularly to said base, an adjusting cam having a helical surface and rotatably mounted at one end of said base with the axis of the helix perpendicular to the base, a connecting arm extending from the spring hinge support of said temperature responsive element into engagement with said helical cam surface whereby the adjustment of the temperature responsive element is effected upon rotation of the adjusting cam, said spring hinge also normally biasing said connecting arm against the cam surface, a heater for modifying the action of said temperature responsive element, said heater supported on the base together with the element spring hinge whereby heat is transmitted thru said hinge to the element, a fixed control element on the other end of the base, and a movable control element on the temperature responsive element cooperating with said fixed control element.

12. A control mechanism of the class described comprising a base, a U-shaped thermostatic element having one end movable responsive to temperature changes and the other end relatively fixed, a heater for modifying the response of the element, a spring hinge, means for supporting the heater and one end of the spring hinge together upon the base, a connecting arm, means for securing the fixed end of the element and one end of the connecting arm together to the other end of the spring hinge, whereby the heating effect of the heater is uniformly transmitted by conduction through the hinge to the element, manual adjusting means supported on the base, whereby adjustment of the manual means moves the element about the spring hinge, a movable switching element carried by the movable end of the element, a fixed switching element on the base in operative relation to the movable switching element, and cooperative magnetic means on the base and the movable end of the element for providing snap action to the operation of the switching elements.

13. A control mechanism of the class described comprising a base, fixed contacts mounted on the base, a hinge secured to the base, a thermostatic element secured to the hinge, a pair of movable contacts pivotally carried on the end of the element and in operative relation to the fixed contacts, a heater associated with the hinge and electrically connected with the fixed contacts so that heat is slowly conducted thru the hinge to modify the normal action of the thermastatic element, an armature supported on the end of the thermostatic element, a magnet supported on the base in operative relation to the armature for providing snap action to the operation of the contacts, a cam rotatably mounted on the base, a connecting arm secured to said hinge, and calibrating means carried on the arm and held in engagement with the cam whereby manual rotation of the cam rotates the thermostatic element about the hinge.

14. A control mechanism of the class described comprising a base, a U-shaped thermostatic element having one end movable responsive to ambient temperature changes in a space to be heated and having the other end relatively fixed, an auxiliary electrical heater for modifying the response of the element, a spring hinge, means for supporting the heater and one end of the spring hinge together upon the base, a connecting arm, means for securing the fixed end of the element and one end of the connecting arm together to the other end of the spring hinge, whereby the heating effect of the heater is uniformly transmitted through the hinge to the element, manual adjusting means supported on the base, calibrating means on the other end of the connecting arm and held in engagement with the manual adjusting means whereby adjustment of the manual means moves the element about the spring hinge, a contact arm pivoted at its center to the movable end of the element, a contact point carried by each end of the contact arm, a pair of spaced fixed contact points mounted upon the base in operative relation to the movable contact points, and a wiper arm on the base adjustably engaging the heater to vary the amount of heat it generates.

15. In an automatic physical condition responsive switching mechanism, the combination of a base, an operating member attached to said base, means for causing said operating member to move relative to the base upon change in value of said condition, a pair of spaced stationary contacts secured to the base and electrically insulated from each other, said contacts facing the same direction, a rigid bar pivotally attached to said operating member and extending in opposite directions from its pivot, said rigid bar being disposed adjacent said stationary contacts and having one end portion offset from its opposite end portion, a flexible bar of conducting material having one end attached to one end of the rigid bar and extending betwen the rigid bar and said stationary contacts, the other end of said flexible bar being free, said flexible bar being spaced from the rigid bar for the major portion of its length by the offset in said rigid bar, a first movable contact carried by the free end of the flexible bar and adapted for engagement with one of said stationary contacts, a second movable contact connected to the attached end of the flexible bar and adapted for engagement with the other stationary contact, and magnetic means including a magnet element and an armature element for imparting snap action to the actuation of said movable contacts, one of said elements being attached to the base and the other of said elements being attached to said operating member.

16. In a control mechanism of the class described, a base, a temperature responsive element having one end supported on the base and the other end arranged for movement responsive to temperature changes, and switching mechanism controlled by the movement of the element, said switching mechanism comprising, a pair of fixed contacts spaced apart on the base, a rigid bar, a flexible arm extending parallel to the rigid bar and secured at one end thereto with the other end free, a movable contact secured to the free end of the flexible arm and spaced from the rigid bar, a second movable contact secured to the rigid bar with the secured end of the flexible arm, means for actuating said rigid bar with movements of the movable end of the temperature responsive element whereby the movable contacts are engaged and disengaged with the fixed contacts, and magnetic means arranged between said pairs of contacts for actuating said contacts with snap action.

17. A control mechanism of the class described comprising a base, a physical condition responsive member, means for supporting one end of the member on the base, a movable bracket actuated by the other end of the member, an armature formed on the bracket, a rigid bar pivotally supported on the bracket, a flexible arm attached to one end of said rigid bar and extending parallel thereto with the other end free, a contact carried by the free end of the flexible arm, a second contact carried on the said one end of the rigid bar, a pair of fixed contacts, a magnet on said base for influencing said armature whereby snap action is provided to the engagement of the contacts upon the operation of condition responsive member, and means for adjusting the height of at least one of the fixed contacts to vary the influence of the magnet upon the armature to thereby adjust the differential of the control mechanism.

18. A control mechanism of the class described comprising a base, a pair of fixed contacts mounted on the base, a spring hinge secured to the base, a thermostatic element secured to the spring hinge, a pair of movable contacts carried on the end of the element and in operative relation to the fixed contacts, an armature supported on the end of the thermostatic element, a magnet supported on the base in operative relation to the armature for providing snap action to the operation of the contacts, a cam rotatably mounted on the base, and a connecting arm secured to the spring hinge and held in engagement with the cam by means of the tension of the spring hinge whereby manual rotation of the cam rotates the thermostatic element about the spring hinge.

19. A control mechanism of the class described comprising a base member, a physical condition responsive element mounted upon the base with one end thereof movable in response to a change of condition, a magnet on said base adjacent the movable end of said condition responsive element, a bracket carried by the movable end of the condition responsive element having an armature arranged to be influenced by the magnet, a contract arm, means for pivotally supporting the contact arm on the bracket with the pivoted movement limited by the armature, a pair of contacts supported on the base in operative relationship to said contact arm, said contact arm operable by movement of the condition responsive element to electrically bridge said contacts and cooperating with the magnet and armature to effect the contact bridging with snap action.

20. In a control device of the class described, a base, a temperature responsive element having one end supported upon the base and the other end arranged for movement responsive to temperature changes, a pair of fixed contacts on the base, a pair of movable contacts, a contact arm supporting one of the movable contacts on each end thereof in operative relation to the fixed contacts, means for pivotally supporting the contact arm between its ends to the movable end of the temperature responsive element whereby equal contact pressure is applied to the contacts in their closed position, a magnetic armature rigidly supported from the movable end of the temperature responsive element and arranged between the movable contacts, a magnet on the base arranged between the fixed contacts and acting upon the armature for providing snap action to the opening and closing movements of the contacts, means for adjusting one of the fixed contacts to adjust the operating differential of the control device, means for indicating the adjustment of the adjustable fixed contact comprising a member having indicia marked thereon, an indicator cooperating with said indicia to indicate the differential adjustment value, and means for operating the indicator upon the adjustment of the adjustable fixed contact.

21. A control mechanism of the class described, comprising a base, a temperature responsive element supported on the base, a pair of fixed contacts on the base, a bridging contact arm actuated by said element, a pair of movable contacts carried on opposite ends of said arm arranged in operable relationship to said fixed contacts, said contacts being opened and closed by said element responsive to temperature changes, said contacts and said contact arm being made of a material resisting the passage of an electric current, and a current path extending through said contacts and said contact arm when the contacts are closed, whereby heat is generated in the contacts and the contact arm to modify the action of said element in addition to that effected by the ambient temperature changes.

22. A control mechanism of the class described comprising, a base, a temperature responsive element, means for supporting said element for movement upon said base, a pair of fixed contact points on said base, a contact arm attached in thermal relationship to said element, a pair of movable contact points secured to said contact arm, said element responsive to temperature changes to move said sets of contact points into cooperative relation with each other, said contact arm being constructed of a material effective to generate heat upon the flow of electric current therethru, and an electric current path extending thru said contact points and said contact arm upon the closure of said contact points by said element whereby heat is produced in said contact arm and thermally conducted through the support therefor to said element to effect the operation of said element to accelerate the opening of said contact points.

23. In a control mechanism of the class described, a temperature responsive element, a pair of fixed and a pair of movable contacts, a contact arm for supporting said movable contacts in operable relation to the fixed contacts, means for pivotally supporting the contact arm from the movable end of the element whereby the contacts are closed upon a temperature drop and opened upon a temperature rise, an electric current path extending in series through said contacts and contact arm in the closed position of the contacts, said contact arm effective to generate auxiliary heat upon the passage of electric current therethrough, said auxiliary heat thermally conducted from the contact arm and through the pivot support therefor to the element whereby the auxiliary heat is effective to act upon said element to augment a temperature rise upon the element and accelerate the opening of the contacts.

24. A control mechanism of the class described comprising a base, control means mounted upon said base and responsive to physical condition changes, means for adjusting said control means to render it effective for different changes of condition, said adjusting means comprising a cam member having a helical portion, means for rotatably supporting said cam upon said base, means on said base for yieldingly holding said cam on its support, a stop on said cam engaging said base after a predetermined movement of the same in either direction of rotation, a number dial supported between said base and said cam, means on said dial engaged by the stop on the cam for rotating said cam with said dial, resilient means interposed between the dial and the cam for normally maintaining said cam and dial in intimate yielding relationship, and locking means on said base for clamping the dial in a set position to the base, said resilient means preventing the cam from altering its adjustment of the control means when the dial is clamped.

25. A control mechanism of the class described comprising a base, a physical condition responsive element mounted on the base, a helical cam having a shaft extending through the base, means whereby the element is adjusted upon rotation of the cam, said cam shaft having a slot on its end, a flexible spring having a forked end engaging the shaft slot and having its other end fastened to the rear of the base, a bearing surface formed on the base around the shaft, said spring urging said cam against the bearing surface of the base for rotative movement thereon, a number dial positioned on the base between the bearing surface and the rear of the cam and having an aperture therein, a stop on the cam extending through said aperture whereby the cam and dial are rotated together, said cam stop engaging the base bearing surface after a predetermined rotation of the cam in either direction, clamping means engaging the dial for clamping it directly on the base bearing surface to prevent movement of the dial and cam in any direction, and a spring washer on the shaft between the cam and dial for eliminating the strain of the clamping means from the cam and thereby maintain the adjustment of the element intact.

26. A control mechanism of the class described comprising a base, a physical condition responsive element supported on said base, means on the base for adjusting the element, said adjusting means comprising a cam having a helical surface, an adjustable connecting arm connecting the element with the helical cam surface, a shaft extending from said cam to the rear side of the base and having a groove on the end thereof, a leaf spring having a forked end engaging the shaft groove and having its other end secured to the base, said leaf spring resiliently holding said cam for rotative movement to the base, a number dial arranged on the shaft between the rear of the cam and the base and having an aperture therein, a stop on the cam engaging the dial aperture whereby rotative movement of the dial moves the cam along with it, means on the base engaged by the cam stop for limiting the rotative movement of the cam and dial in either direction, and resilient means interposed between the cam and dial for urging them apart and relieving the cam of strain whereby the adjustment of the element is maintained uniform when the dial is rotated.

27. A control mechanism of the class described comprising a base, switching mechanism mounted on the base, a cover for enclosing the switching mechanism having openings at the top and bottom thereof to permit the ambient air to have access to the switching mechanism, a scale plate arranged on the front of the cover and having an opening therein, a condition indicating device positioned in the scale plate opening so as to be visible from the front of the cover, a flexible strip resiliently and adjustably supporting said condition indicating device in said cover against said scale plate, guard plates arranged at the top and bottom openings of said cover, and means for securing said guard plates, said flexible strip and said scale plate to said cover.

28. A control mechanism of the class described comprising a base, switching mechanism mounted on the base, a cover therefor having openings at the top and bottom thereof to permit the free passage of air around said switching mechanism, a guard plate on said cover protecting the top opening and another guard plate for the bottom opening, said cover also having an opening and a recess at the front thereof, a scale plate on the front of the cover having an opening therein coinciding with the cover opening, one end of said scale plate being positioned in the cover recess to hold the same, a condition indicating device positioned within said cover and extending through the front opening thereof adjacent the scale plate so as to be visible from the front of the cover, a flexible strip in said cover resiliently and adjustably supporting said condition indicating device against said scale plate, a screw threaded into the scale plate from the rear of the cover for clamping the upper end of the scale plate, the flexible strip and the top guard plate to the cover, and a second screw threaded into the cover from the rear of the same for clamping the lower end of the flexible strip and the bottom guard plate to the cover.

29. In a control instrument, a base, a generally U-shaped structure mounted upon said base, said structure forming a thermal responsive means the legs of which move relatively to each other upon change in temperature, a control device actuated by one leg of said thermal responsive means, stop means for limiting relative movement between said legs in one direction, and adjusting means for moving the other leg of said thermal responsive means, said adjusting means being arranged to move said other leg to a point at which said stop means becomes effective before the control device is actuated to one position by said one leg, whereby the adjusting means may be adjusted to prevent said control device from being actuated to said one position irrespective of the prevailing temperature.

30. A control mechanism of the class described comprising a base, a physical condition responsive element, a locking bracket, means for hingedly supporting said element and locking bracket together to the base, cooperable control means on the base and element controlled by the movement of said element in response to a change in condition affecting it, variable operable means on said base for adjusting said element to effect its control at particular values of the condition affecting the element, said variable operable means having an abrupt cam surface at each limit of adjustment and cooperating means on said element and said locking bracket for preventing said element from exercising its control over said control means whenever said variable operable means is operated to either of its limits of adjustment.

31. In a control mechanism, a base, a physical condition responsive element supported upon the base for movement perpendicular thereto, adjusting means arranged for axial movement on the base, said adjusting means comprising a helical cam having an abrupt cam surface at each of its limits of adjustment, connecting means extending between the physical condition responsive element and the helical cam whereby the physical condition responsive means is variably adjusted for operation whenever the helical cam is adjusted between the abrupt cam surfaces, control means actuated by the operation of the physical condition responsive means, and means responsive to the movement of either of the abrupt cam surfaces by the adjusting means into engagement with the connecting means for preventing the physical condition responsive means from actuating the control means.

HERBERT E. LINDEMANN.